United States Patent [19]
Earle et al.

[11] 4,117,302
[45] Sep. 26, 1978

[54] METHOD FOR FUSIBLY BONDING A COATING MATERIAL TO A METAL ARTICLE

[75] Inventors: Michael Earle, Mapleton; Glenn H. Lenzen, Jr., Peoria, both of Ill.

[73] Assignee: Caterpillar Tractor Co., Peoria, Ill.

[21] Appl. No.: 543,191

[22] Filed: Jan. 24, 1975

Related U.S. Application Data

[63] Continuation-in-part of Ser. No. 447,971, Mar. 4, 1974, abandoned.

[51] Int. Cl.² ............................................. B23K 26/00
[52] U.S. Cl. ........................ 219/121 LM; 29/156.7 R; 219/76.1
[58] Field of Search ..... 219/121 L, 121 LM, 121 EB, 219/121 EM, 121 P, 76, 77, 76.1; 29/156.7 R, 156.7 A

[56] References Cited

U.S. PATENT DOCUMENTS

| 3,303,319 | 2/1967 | Steigerwald | 219/121 L |
|---|---|---|---|
| 3,310,423 | 3/1967 | Ingham, Jr. | 219/121 L X |
| 3,362,057 | 1/1968 | Kubera et al. | 29/156.7 |
| 3,410,203 | 11/1968 | Fischbeck | 219/121 L |
| 3,417,223 | 12/1968 | Steigerwald | 219/121 L |
| 3,663,793 | 5/1972 | Petro et al. | 219/121 LM |
| 3,673,374 | 6/1972 | Hauck | 219/76 |
| 3,802,927 | 4/1974 | Gomada | 219/121 L X |
| 3,806,692 | 4/1974 | Few | 219/121 EM |
| 3,813,509 | 5/1974 | Woods et al. | 219/76 |
| 3,848,104 | 11/1974 | Locke | 219/121 L |
| 3,855,444 | 12/1974 | Palena | 219/76 |
| 4,015,100 | 3/1977 | Gnanamuthu et al. | 219/76 |

OTHER PUBLICATIONS

Alfred O. Schmidt, "Tools & Engineering Materials With Hard, Wear-Resistant Infusions", *Journal of Engineerng for Industry*, 8/1969, pp. 549–552.
Pertinent Sections of U.S. Patent Application S.N. 431,240, filed 1/7/1974, by Gnanamuthu et al.

*Primary Examiner*—J. V. Truhe
*Assistant Examiner*—Clifford C. Shaw
*Attorney, Agent, or Firm*—Charles E. Lanchantin, Jr.

[57] ABSTRACT

A method for fusibly bonding a coating material to a metal article includes depositing such coating material in solid form on a surface of the article, substantially simultaneously thermally liquifying the coating material and the surface of the article by focusing a relatively high power continuous wave laser beam thereon, and removing the laser beam therefrom to allow cooling and hardening thereof so as to provide a solidified surface layer with a strong and relatively thin interstitial bond between the layer and the article. An exemplary engine valve with a relatively fine structure of the coating material for increased hardness is disclosed.

9 Claims, 6 Drawing Figures

Fig-2-

METHOD FOR FUSIBLY BONDING A COATING MATERIAL TO A METAL ARTICLE

CROSS REFERENCE TO RELATED APPLICATIONS

The present application is a continuation-in-part of U.S. patent application Ser. No. 447,971 to M. Earle et al., filed Mar. 4, 1974, and now abandoned.

BACKGROUND OF THE INVENTION

Surface alloying of metals is usually accomplished by welding processes or various flame and plasma spraying techniques. Welding processes utilize an electrical or gaseous energy source with a highly variable power level which is difficult to control. As a result, excess heat is normally directed to the article being coated and the microstructure thereof is often adversely affected so that additional heat treatment is subsequently necessary. While the strength of the bond between the surface coating and article may be sufficient with such welding processes, an excessively thick coating is normally provided because of irregularities in the deposition rate and the lack of the full ability to control its placement. Such excess coating must, in many instances, be machined off to achieve the desired final surface contour at additional expense. Further, welding processes are basically accomplished at a rather slow material deposition rate and the accompanying control problems often lead to impurities in the microstructure, cracks or porosity, or other forms of harmful metallurgical defects which tend to decrease the strength of the coating and its bond to the article.

By way of example, engine valves of austenitic chrome nickel silicon steel with Stellite No. 6 coating material fusibly bonded thereto around the annular valve seat portion thereof have been widely adopted by the diesel engine industry. Such coating material is available from the Stellite Division of Cabot Corp., Kokomo, Ind. These valves are produced by a relatively complex manufacturing process utilizing gaseous torches to extensively heat the valve head prior to, during, and subsequent to depositing the Stellite coating material thereon. This process is known as "puddle welding." The disadvantages of this expensive and relatively slow process include directing an excessive amount of heat into the base material and slow cooling of the coating. This results in a relatively thick overall diffusion zone or region of interstitial bond of approximately 0.020 inch between the base material and the coating as well as dendritic segregation and enlarged crystallization of the coating material with an accompanying decreased hardness thereof. Further, the thick diffusion zone represents a region having neither the desirable properties of the base material or of the coating. For example, it is known that the iron in the steel degrades the Stellite when present in only relatively minute amounts. Accordingly, the service life of these valves is not as high as desired.

On the other hand, flame and plasma spraying techniques apply a coating material to an article without substantial heating of the article, with the result that a relatively poor metallurgical bond occurs therebetween. Such a technique is usually limited to a coating thickness of a few thousandths of an inch having generally low strength. U.S. Pat. No. 3,310,423 issued Mar. 21, 1967 to H. S. Ingham, Jr. discloses a flame spraying process for applying a coating utilizing instantaneous energy bursts from a laser beam to raise the temperature of the previously heated flame sprayed particles as they are propelled toward the surface of an article. The substantially molten particles are purported to adhere to the surface of the article upon contact therewith with a better bond than conventional flame spraying processes, which are generally known to have a relatively weak bond between the coating and the article, and coating porosity. This method is more expensive because it requires dual heating and, further, the thickness of the applied layers is restricted to only a few thousandths of an inch. Because of these deficiencies, flame spraying processes have been considered entirely unsatisfactory for hard facing an engine valve, for example.

Other heating sources such as the possible use of solar energy or electron beam energy appear to raise more difficult problems. With solar energy, a large and expensive heat gathering system is needed in order to obtain sufficient power density energy levels and the broad spectrum energy source is continually changing. Likewise, with electron beam energy a relatively expensive evacuation system is normally necessary, and this greatly restricts the manufacturing process of the parts to be coated. For example, the vapor pressure of either the coating material or the article could be adversely affected and some materials might volatilize, imposing further limits on material choice which is already limited by the electron beam welding process itself.

Illustrative of the wide range of efforts to solve the particular problem of applying a hard surface coating to the head of an engine valve, for example, are U.S. Pat. No. 3,147,747 to LeRoy O. Kittelson; U.S. Pat. No. 3,362,057 to Gerhard Kubera et al.; and U.S. Pat. No. 3,649,380 to Max. J. Tauschek. Also, U.S. Pat. No. 3,478,441 to Alexander Goloff et al. and assigned to the assignee of the present invention discloses a method of friction welding a facing material workpiece to an engine valve to provide an impact resistant seat thereto. However, none of these methods completely solves the various problems, including the frequent need to machine off the excess coating, or solves them in a sufficiently economical manner. One other method, U.S. Pat. No. 3,663,793 to James Petro et al., describes a way of applying a coating to a glass light bulb or the like for decorative purposes, using heat from a laser beam or an electron beam. However, such method employs an additional heating step and makes no mention of improving the wear and impact resistant service life of the coating and its bond with the parent article to which the present invention is particularly directed.

SUMMARY AND OBJECTS OF THE INVENTION

It is therefore an object of the present invention to provide an improved method for fusibly bonding a coating material to the surface of a metal article wherein a relatively high strength interstitial bond is obtained.

Another object of the present invention is to provide such an improved method capable of applying a relatively uniform hard surface coating to an article of dissimilar material by thermal liquification of the material and adjacent portion of the article.

Another object of the present invention is to provide a relatively quick method of fusibly bonding a solid coating material placed against the surface of a metal article in order to minimize heat transfer into the entire article and to thereby accelerate the cooling thereof from its liquified state after the heat source is removed therefrom.

Another object of the method of the present invention is to provide a metal article with an improved wear and impact resistant surface layer thereon, including a relatively fine crystalline structure of the surface layer and a relatively thin, but strong interstitial bond between it and the base material of the article.

Another object of the method of the present invention is to provide an improved engine valve with a fusibly bonded annular valve seat thereon having a relatively fine crystalline structure for increased hardness and resistance to wear, and improved controllability of the metallurgical structure thereof.

Another object of the present invention is to provide an improved method of the character described in which a relatively high energy continuous wave laser beam is precisely focused upon a relatively small area of the article being coated in order to minimize heat transmission to the entire article.

Other objects and advantages of the present invention will become more readily apparent upon reference to the accompanying drawings and the following description.

DESCRIPTION OF PREFERRED EMBODIMENT

Figure 1:
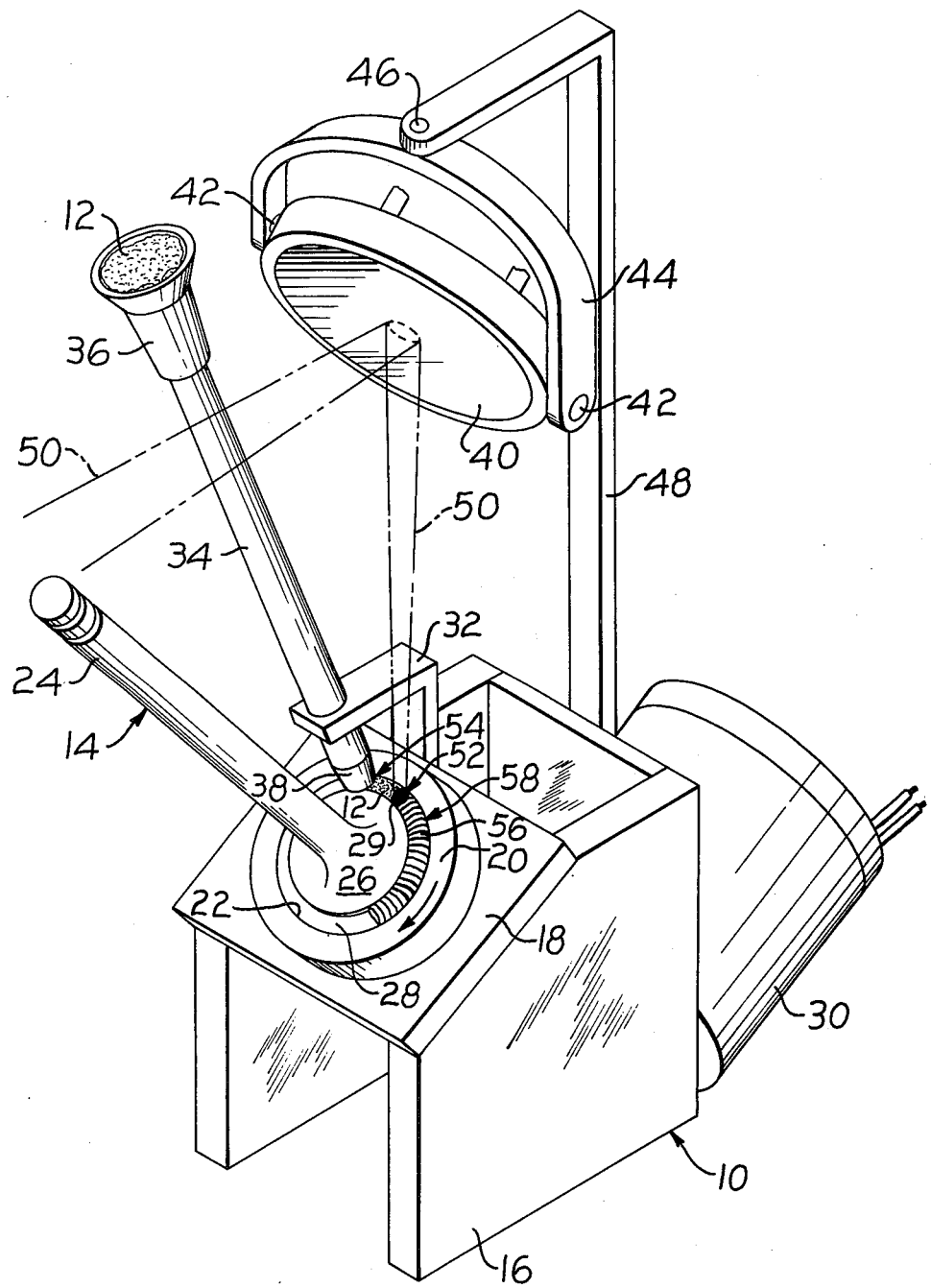
FIG. 1 is a perspective of an article holding fixture for fusibly bonding a coating material to a metal article in accordance with the novel method of the present invention.

FIG. 1 of the drawings shows an article holding fixture 10 for fusibly bonding a coating material of fusible powder 12 to the surface of a ferrous metal article 14 such as an engine valve or the like in accordance with the method of the present invention. In the instant embodiment, Stellite No. 6 powder is effectively bonded to the engine valve 14 of dissimilar material such as an austenitic chrome nickel silicon steel. The article holding fixture 10 which rotatably supports the engine valve includes a framelike base 16 which supports an obliquely upwardly facing mounting plate 18 on which is rotatably mounted an article holding disc 20 having a concentrically disposed cylindrical recess 22 formed therein.

The engine valve 14 includes an upwardly extending stem portion 24 and a lower head portion 26 adapted to be received in frictionally sliding relation within the cylindrical recess 22 in the rotatable holding disc 20. In this manner the engine valve is obliquely positioned at an approximately 45° angle to a horizontal plane by virtue of the relative disposition of the mounting plate 18 and the article holding disc 20. This beneficially results in an annular seat 28 on the head portion of the valve being maintained in substantially a horizontal plane at, and substantially adjacent, the uppermost portion or apogee of the rotating valve as shown generally by the reference numeral 29. A variable speed drive motor 30 is suitably attached to the base 16 of the holding fixture 10 in driving relation with the article holding disc 20 for rotation of the engine valve at a relatively fast predetermined speed, for example 5 seconds per revolution.

An angled brace 32 is adjustably secured to the base 16 of the article holding fixture 10 of the present invention for holding a gravity fed powder delivery tube 34 in a generally upright manner above and inwardly adjacent to the periphery of the head portion 26 of the valve 14. The delivery tube has a funnel 36 at the upper end thereof adapted to conveniently receive the fusible powder 12, and a conical tapered lower end 38 disposed in predetermined relatively closely spaced relation to the annular seat 28 of the valve 14.

A water cooled, substantially flat reflective mirror 40 is universally adjustably supported substantially directly above the valve head 26 on a pair of horizontally aligned spaced pivot connections 42 of a depending yoke 44 and on a vertical pivot connection 46 intermediate the yoke and an upright arm 48 which is secured to the base 16. A fixed beam of relatively high power coherent electromagnetic energy 50, such as preferably a multi-kilowatt continuous wave laser beam, is substantially horizontally projected on the mirror 40 as shown in broken lines from a suitable source (not shown). The continuous wave laser beam 50 is then reflected downwardly by the mirror and focused on the annular seat 28 of the valve 14 to provide a relatively high energy heat interaction zone as indicated by the reference numeral 52. This heat interaction zone substantially coincides with the apogee 29 of the rotating valve.

Effective fusion of the powder 12 and the annular seat 28 at the interaction zone 52 is achieved using the laser beam 50 with a cross sectional beam pattern of substantially doughnut shape. Specifically, the preferred doughnut shaped laser beam pattern is 3/16 inch O.D. and 1/16 inch I.D., which results in a power density of $2.85 \times 10^5$ watts per square inch.

The powder delivery tube 34 is disposed arcuately offset from the apogee 29 of the valve 14 and closely above the annular seat 28 to provide a powder deposition zone generally indicated by the reference numeral 54. However, this powder deposition zone is relatively close to the apogee so that the annular seat 28 is substantially horizontally disposed and the fusible powder 12 is better retained thereon. Further, the conically tapered lower end portion 38 of the delivery tube 34 and its proximal location to the valve head portion 26 serves to meter the rate of delivery of the powder to the annular seat. For example, the powder fills up the space therebetween and no flow occurs as long as the valve remains stationary, yet flow occurs at the desired rate with a self-leveling action upon rotating the valve at the desired speed.

The article holding fixture 10 of the present invention, including the powder delivery tube 34, the reflective mirror 40, and laser beam 50 effectively produces a hard alloy layer or surface 56 on the engine valve 14. This surface becomes substantially solid at a solidification zone 58 which is also relatively close to the apogee 29 of the engine valve so that the melt of the powder 12 and adjacent portion of the valve which is liquified at the heat interaction zone 52 remains substantially horizontal and does not appreciably flow prior to such hardening.

It is extremely significant to note that by utilizing the manufacturing method of the present invention to apply the hard alloy layer 56 on the engine valve 14 the hardfacing portion of the cost can be reduced to approximately half that of conventional puddle welding techniques.

OPERATION

While the operation of the present invention is believed clearly apparent from the foregoing description, further amplification will subsequently be made in the following brief summary of such operation. The motor 30 and continuous wave laser beam 50 are simultaneously actuated to initiate the deposition of the powder 12 on the the annular seat 28 of the engine valve 14 at the deposition zone 54, and to also impinge the extremely hot pattern of the laser beam thereon at the heat interaction zone 52. As the article holding disc 20 and engine valve are rotated by the motor in a clockwise direction as shown by the arrow in FIG. 1, the focused laser beam relatively rapidly thermally liquifies both the powder and adjacent portion of the valve head 26 at the interaction zone without excessive heating of the entire engine valve. The resulting melt thereafter travels beyond the heat of the laser beam at the interaction zone, and the rapid transfer of heat therefrom to the relatively cool mass of the engine valve, coupled with ambient air or room cooling thereof, quickly results in obtaining the hard alloy surface 56 at the solidification zone 58. This alloy surface is relatively thick, for example, 0.050 inch (1.27 mm), and has an extremely uniform cross section with an excellent interstitial bond. Such hard surface has been found so uniform in profile that only a minimum of final machining thereof is necessary to produce the completed engine valve.

Figure 2:
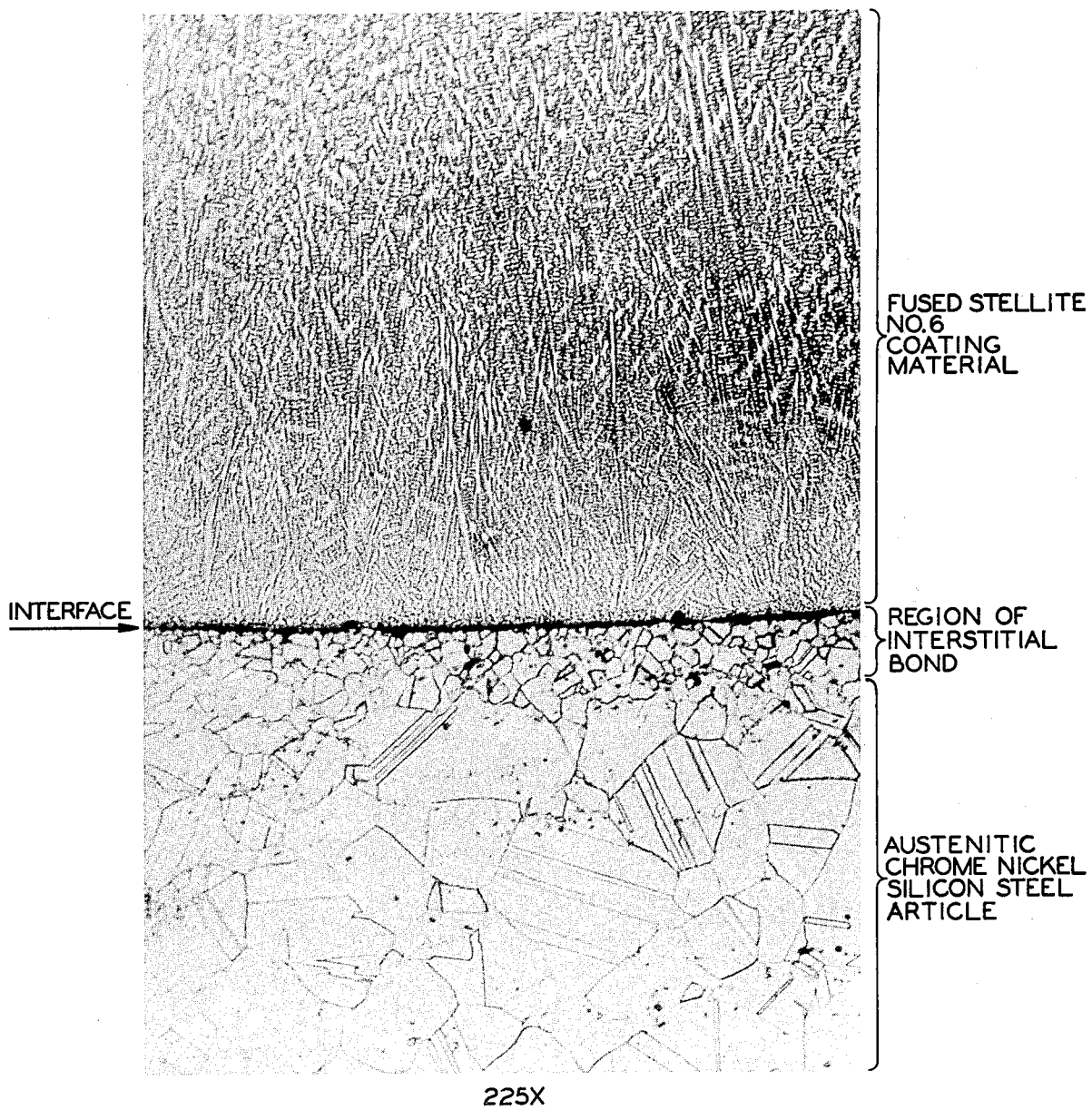
FIG. 2 is a photomicrograph of a polished and etched portion of an article and associated hardened coating produced by the method of the present invention at a magnification of approximately 225 times its true size.
Figure 3:
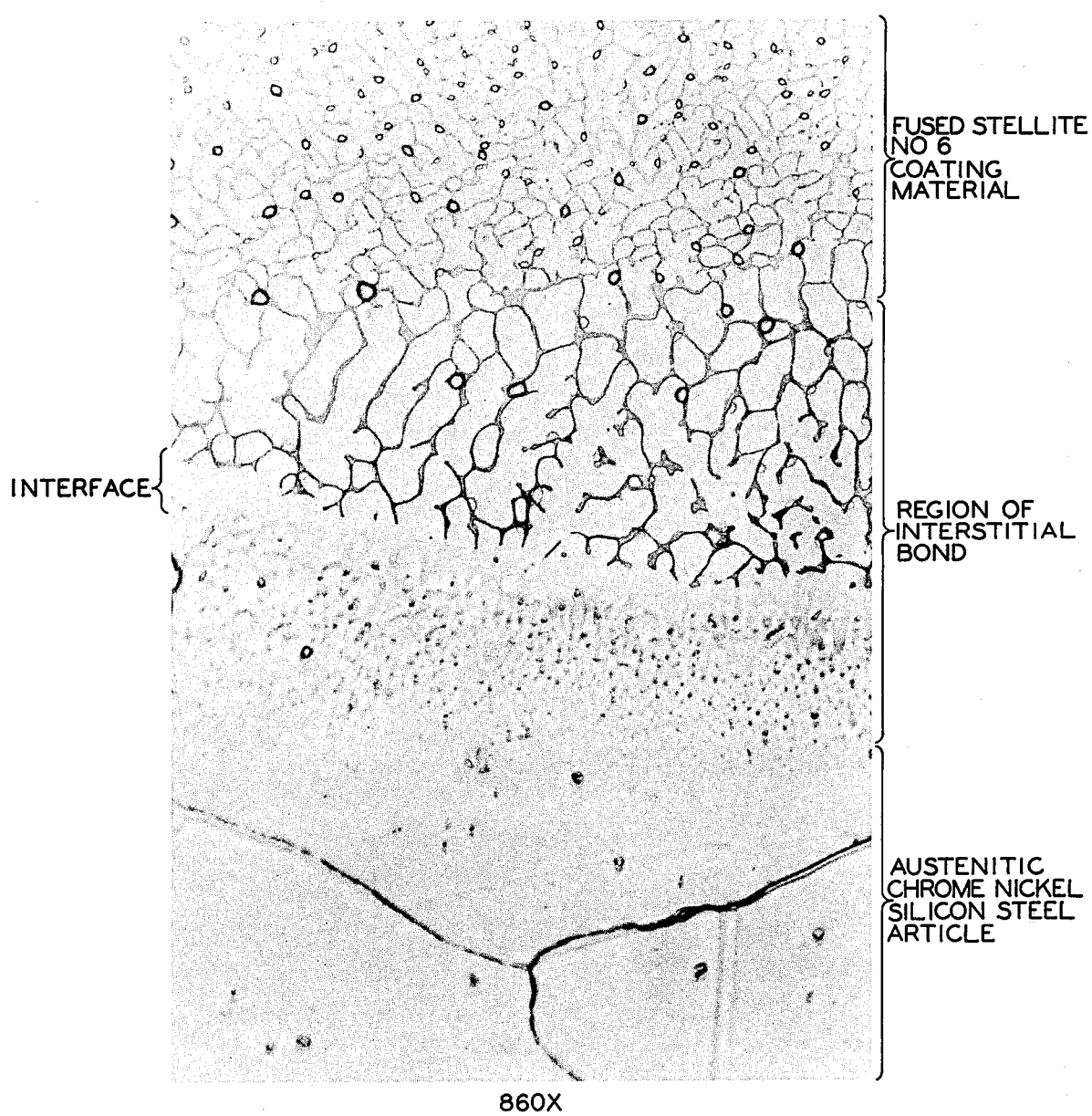
FIG. 3 is a photomicrograph similar to FIG. 2, only enlarged to a magnification of approximately 860 times its true size to better show the interface between the article and coating.

The effectiveness of the fusible bonding method and apparatus of the present invention is shown by the photomicrograph of FIG. 2. This clearly indicates the relatively thin, but high quality interstitial bond between the hard metallic alloy surface 56 and the metallic base material of the engine valve 14. The upper portion of the photomicrograph shows the relatively fine microstructure of the Stellite No. 6 surface, while the lower portion thereof shows the uniform distribution of fine carbides in an austenitic matrix which is associated with the austenitic chrome nickel silicon steel of the engine valve. Between these two regions is a relatively thin overall diffusion zone or region of interstitial bond which clearly illustrates the relatively complete fusion thereof, the absence of cracks or voids, and the absence of oxide inclusions or the like which would deleteriously affect the structure. Such thin region of interstitial bond is pictorially noted to be approximately 0.003 inch (0.075 mm) thick, and with the dark line resulting from the etchant used representative of a substantially planar interface. As is more clearly shown in the more greatly enlarged photomicrograph of FIG. 3, this planar interface is noted to be only about 0.0005 inch (0.012 mm) thick and yet the uniformity thereof is indicative of a high strength bond.

Figure 4:
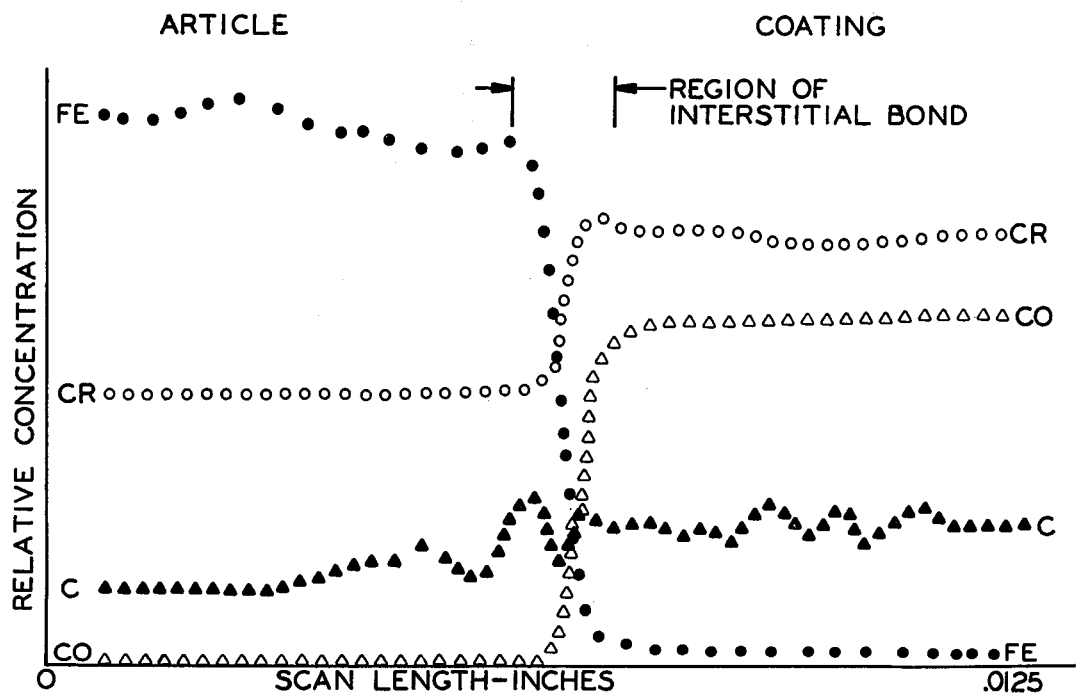
FIG. 4 is an electron microprobe line scan across an article and associated hardened coating produced by the method and apparatus of the present invention, and particularly an engine valve having an austenitic chrome nickel silicon steel base material and a Stellite No. 6 coating at the valve seat thereof.
Figure 5:
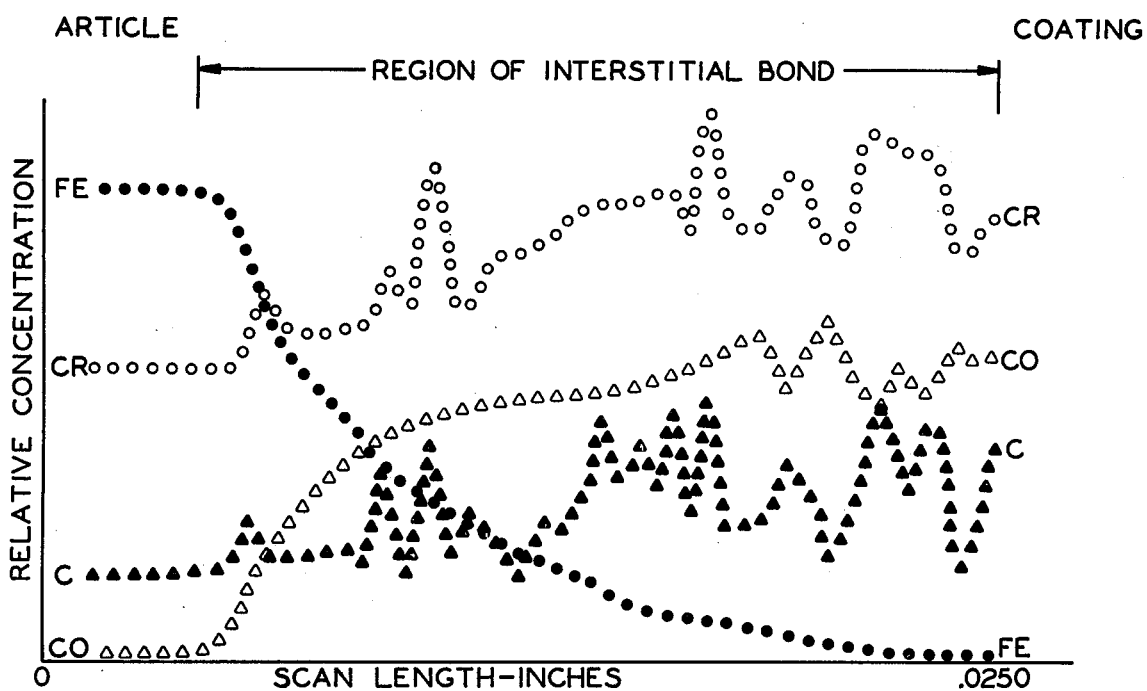
FIG. 5 is an electron microprobe line scan of a conventional engine valve produced by puddle welding and having an austenitic chrome nickel silicon steel base material and a Stellite No. 6 coating at the valve seat thereof for purposes of comparison with FIG. 4, and at twice the scan length thereof.

As best shown in FIG. 4, an electron microprobe line scan of the engine valve 14 of the present invention indicates an extremely uniform metallurgical composition of the ferrous base material and metallic coating, which are respectively disposed to the left and right when viewing the graph. The relative qualitative, not quantitative, concentration values of the elements iron (Fe), chromium (Cr), carbon (C), and cobalt (Co) are shown, while for illustrative convenience the concentration values of the primary remaining elements nickel, silicon and tungsten have been omitted from the graph. It is apparent that the smoothness of the scan lines confirms the fine grain structure of the coating, as well as the thin region of interstitial bond comparable to that shown in the photomicrograph of FIG. 2. On the other hand, upon inspection of FIG. 5 showing a line scan of a conventional puddle-welded engine valve, it is clear that the thickness of the region of interstitial bond is approximately 0.020 inch (0.5 mm), which is approximately ten times the 0.002 inch (0.05 mm) thickness of the corresponding region in FIG. 4. Note is also made in FIG. 5 of the very significant extent of the dissolution of the iron (Fe) present in the base material into the coating of the prior art engine valve, which can deleteriously embrittle and reduce the oxidation resistance thereof. Such dissolution is advantageously negligible in the engine valve of the present invention as shown in the relatively abrupt descendency of the iron line in FIG. 4. Also, the coinciding peaks and valleys in the chrome (Cr), cobalt (Co) and carbon (C) scan lines of the prior art coating in FIG. 5 are indicative of the formation of large crystals, such as chromium carbides, which accompanies the high heat input and slow cooling operation of puddle welding. Note that such peaks are substantially absent in the line scan of the coating of FIG. 4, indicating its fine grain structure.

Figure 6:
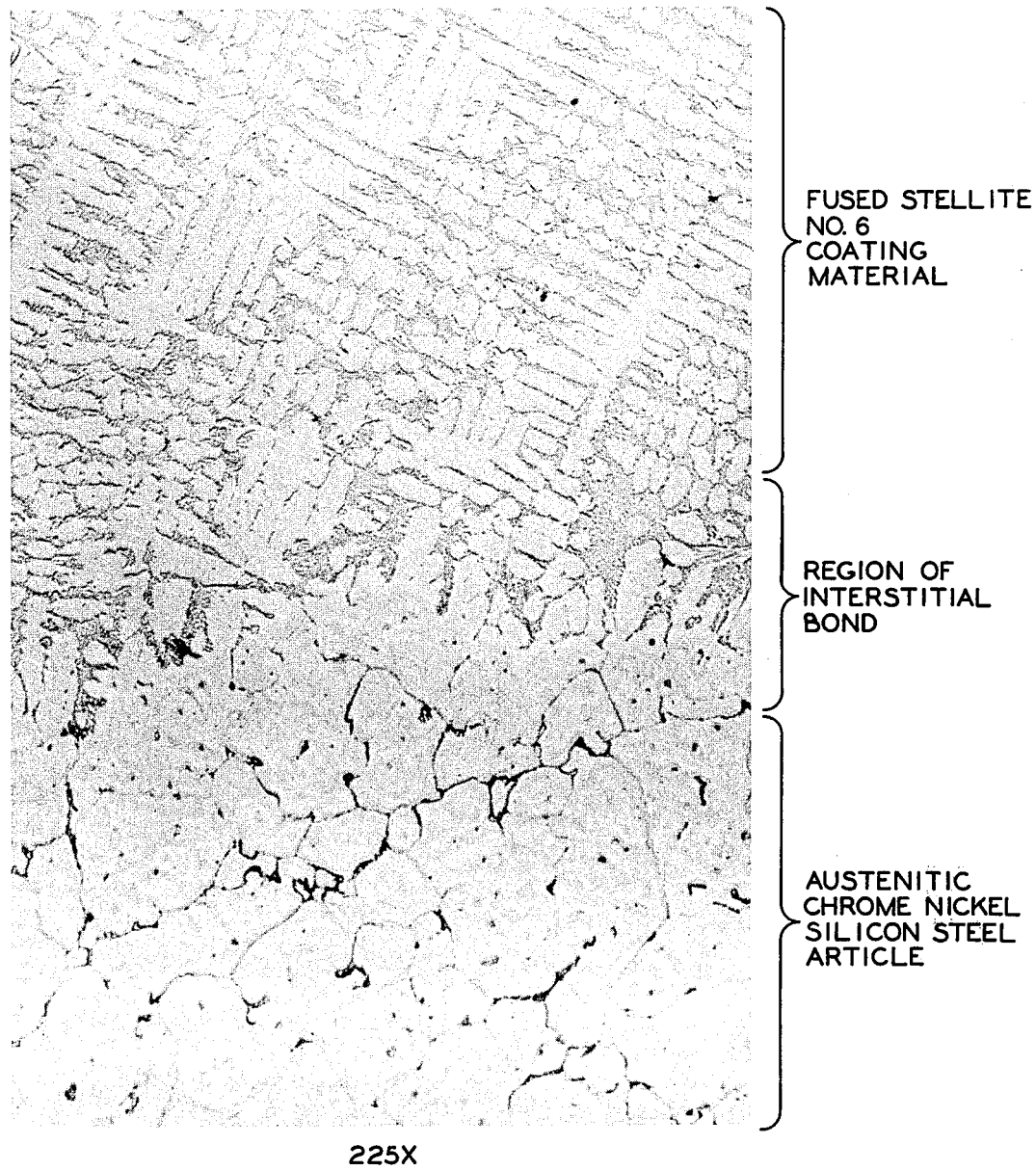
FIG. 6 is a photomicrograph of a polished and etched portion of the conventionally puddle-welded engine valve at a magnification of approximately 225 times its true size for purposes of comparison with FIG. 2.

As best shown in the photomicrograph of FIG. 6, the prior art coating exhibits relatively large dendritic formations with carbides in a cobalt matrix, and this is dramatically distinct from the much finer coating structure of the present invention as shown in FIG. 2. This metallurgical difference is reflected in Rockwell hardness readings of $R_c$ 65–67 in the Stellite coating of the present invention, as compared to the usual $R_c$ 62–65 Stellite coating readings of prior art. Such increased hardness results in an engine valve having increased resistance to wear.

Thus, the fusible bonding method and apparatus of the present invention has proven extremely effective in hard facing an engine valve using continuous wave laser energy as a heat source. An examination of the microstructure of the hard alloy surface and the metal article has indicated excellent fusion therebetween and a relatively narrow but high strength interstitial bond. Further, the relatively high power laser beam has been found to be closely controllable to minimize the transmission of heat into the remainder of the article, and accordingly quicker cooling thereof. On the other hand, it can easily be focused or collimated to provide uniform heat distribution over a relatively wide path. For example, laser beam widths of greater than ⅛ inch (3.175 mm) are easily achieved, whereas electron beam widths are normally restricted to less than 1/16 inch (1.59 mm).

Greater surface areas can therefore be hard surfaced utilizing the method of the present invention.

It should also be appreciated that the method and apparatus of the present invention may be easily adapted to make a composite metal article by applying a relatively solid coating material with a preformed shape to the base material. For example, rather than depositing only the relatively clean and pure powder 12 on the engine valve 14 as in the instant case, such powder can be mixed with a suitable binder and formed into an annular ring. The ring can then be placed on the valve and subjected to the heating energy of the laser beam 50 substantially as described above without departing from the spirit of the present invention. It is apparent that various relatively thick coatings of material dissimilar to the base material, in the order of 0.050 inch (1.27 mm) thickness, can be quickly applied in a single pass utilizing these principles. This obviates the need to make multiple passes which can excessively heat the article.

While the invention has been described and shown with particular reference to a preferred embodiment, it will be apparent that other variations might be possible that would fall within the scope of the present invention, which is not intended to be limited except as defined in the following claims.

What is claimed is:

1. A method of fusibly bonding a substantially solid powder coating material to a metal article, which comprises:

Step (a) depositing the powder in the form of a band of powder onto a surface of the metal article, the band of powder being substantially uniformly levelled and of a preselected width;

Step (b) melting a portion of the band of powder by focusing a laser beam thereon;

Step (c) immediately thereafter melting the surface of the metal article by the heat of the laser beam on the band of powder at a heat interaction zone; and Step (d) relatively moving the focused laser beam and the heat interaction zone along the band of powder at a rate sufficient for forming a traveling melt and maintaining heat transfer into the article and cooling of a trailing portion of the melt at preselected values and subsequent hardening of the trailing portion of the melt at a relatively fixed distance from the heat interaction zone, the relative rate of laser beam movement and heat transfer being sufficient for providing a solidified surface layer having physical properties resulting essentially from heating and cooling of only the powder and a relatively thin, strong region of interstitial bond between the surface layer and the article having physical properties resulting essentially from heating and cooling of both the powder and the metal article.

2. The method of claim 1 including preforming the band of powder to a preselected shape prior to step (a).

3. The method of claim 1 wherein step (a) and step (b) take place substantially at the same time.

4. The method of claim 1 wherein step (a) includes metering a powdered metal onto the surface of the article from a powder delivery apparatus.

5. The method of claim 4 wherein step (d) includes passing the article and the band of powder through a stationary heat interaction zone.

6. The method of claim 4 wherein step (a) includes passing the article under a stationary powder delivery apparatus.

7. The method of claim 4 wherein step (d) includes simultaneously rotating the article under the powder delivery apparatus while holding the apparatus stationary to form the band of powder and arcuately passing the formed band of powder through a stationary heat interaction zone.

8. The method of claim 4 including maintaining the heat interaction zone a preselected fixed distance from the powder delivery apparatus.

9. The method of claim 4 wherein the article is an engine valve and step (d) includes rotating the valve and the band of powder through a stationary heat interaction zone.

* * * * *